Jan. 24, 1961 P. R. GILSON 2,969,529

MAGNETIC READ-WRITE HEAD HAVING TWO GAPS

Filed May 17, 1957 2 Sheets-Sheet 1

INVENTOR.
PAUL R. GILSON

BY Christie, Parker & Hale
ATTORNEYS.

MAGNETIC READ-WRITE HEAD HAVING TWO GAPS

Filed May 17, 1957

INVENTOR.
PAUL R. GILSON

BY Christie, Parker & Hale

ATTORNEYS.

United States Patent Office 2,969,529

Patented Jan. 24, 1961

2,969,529

MAGNETIC READ-WRITE HEAD HAVING TWO GAPS

Paul R. Gilson, West Covina, Calif., assignor to Burroughs Corporation, Detroit, Mich., a corporation of Michigan Filed May 17, 1957, Ser. No. 659,779

12 Claims. (Cl. 340—174.1)

This invention relates to transducers and, more particularly, is concerned with a magnetic head for reading and writing simultaneously on magnetic tape or the like. This application is a continuation-in-part of application Serial No. 617,492, filed October 22, 1956, now abandoned.

The technique of recording information on and reproducing information from magnetic tape is well known. The transducer used generally involves a closed loop magnetic core having an air gap in one point therein across which the tape is drawn. A coil wound on the core is used either for varying the flux across the gap during recording or for generating currents in response to changes in flux induced across the gap by the magnetic tape passing over the gap during play-back.

Rather than using the same transducer head for both writing and reading from the magnetic tape, it has heretofore been proposed to have separate heads spaced along the tape, the first head being used to record on the tape and the second head being used to play back information on the tape. This arrangement permits the information to be monitored directly from the tape on the same pass of the tape during which the recording is effected. However, the write head and the read head must be spaced far enough apart so that they can be effectively shielded from each other magnetically. Because the tape takes a finite time in traveling from the recording position to the play-back position, a substantial time delay is introduced between the original signal being recorded and the play-back signal derived from the tape.

In computer work and other data processing machines utilizing tape recording, it is highly desirable to check the signal as recorded on the tape against the signal being recorded, to eliminate a possible source of error in the computer system. To do this the time delay between the write signal and the read signal must be short enough to make the necessary buffering practical. At normal tape speed it has been found that this requires the reading gap and the writing gap in the respective read and write transducers to be spaced less than .050 inch along the tape. Spacings of this order have heretofore been impractical because it has been impossible to completely shield the two gaps magnetically from each other.

The present invention provides a magnetic head design providing two closely spaced gaps in contact with the tape, one for writing and one for reading. By special core design, there is no effective magnetic coupling between the writing coil and the reading coil wound on the single core.

The invention is hereafter described in detail in connection with the accompanying drawing, wherein.

Figure 1:
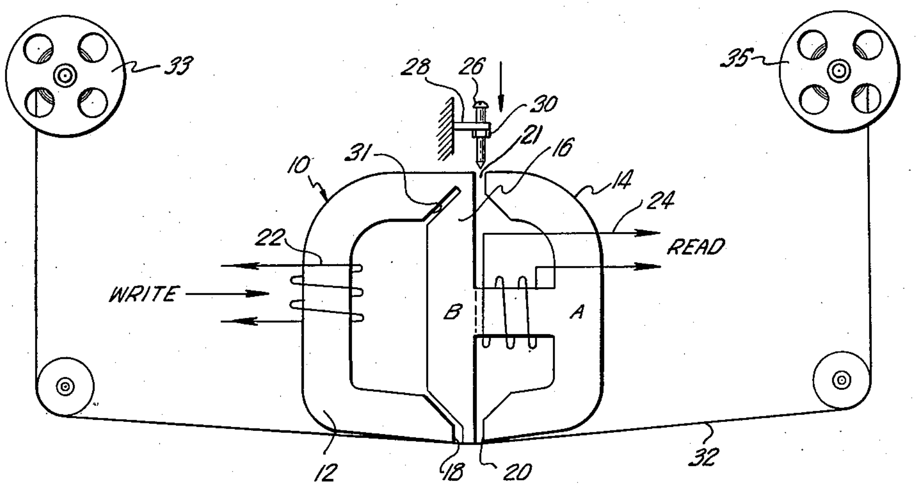
Fig. 1 is a diagrammatic showing of one embodiment of the transducer of the present invention.

Referring to Fig. 1, the numeral 10 indicates generally the core of the transducer head, which core may be made up of a stack of laminations having the outline shape as shown in the figure. The laminations are made of Permalloy or other suitable magnetic material, such as ferrite, having a very high permeability. The laminations may be bonded, riveted, or otherwise secured in a stack to form the core.

As is apparent from Fig. 1, the form of the core may be described as having three portions; the first a U-shaped portion to the left, indicated at 12, an E-shaped portion to the right, as indicated at 14, and a central I-shaped portion 16. The entire lamination, including the U-shaped portion 12, the E-shaped portion 14, and the I-shaped portion 16, can be stamped out of a single sheet of material, with a pair of closely spaced air gaps 18 and 20 being provided at one junction between the three portions of the core. These gaps provide respectively the writing gap and the reading gap of the magnetic transducer head. Another gap 21 is provided for reasons which will hereinafter become apparent between the E-shaped portion 14 and the I-shaped portion 16 at the opposite junction joint between the three portions of the core lamination.

A coil 22 is wound on the central part of the U-shaped portion 12 of the core 10. A similar coil 24 is wound on the central arm of the E-shaped portion 14 of the core 10. The coil 22 is used as the writing coil and the coil 24 is used as the reading coil. However, the gap 18 and coil 22 may be used for play-back, and the gap 20 and coil 24 used for recording just as well, since the device is symmetrical in its operation.

Figure 2:
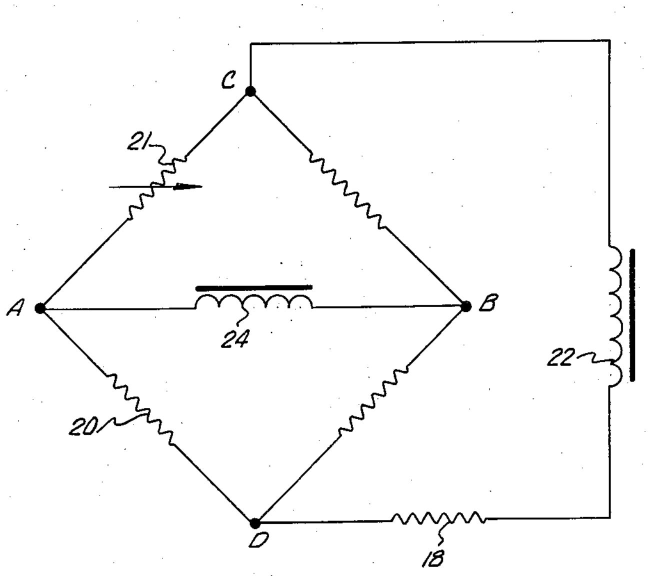
Fig. 2 is a schematic diagram of the magnetic circuit formed by the core of the transducer illustrated in Fig. 1.

The operation of the double transducer head can best be understood by reference to the schematic diagram of Fig. 2 illustrating the magnetic circuit of the core 10. It will be seen that the magnetic circuit has a bridge-type configuration made up of four reluctance arms; A—C, A—D, C—B, and B—D. The reluctance of the magnetic path from point A to point D includes the gap 20. Similarly, the reluctance of the magnetic path from point A to point C includes the gap 21. It will be seen that by varying the reluctance of the gap 21, as indicated by the variable reluctance in the bridge arm A—C of Fig. 2, the bridge can be balanced so that any flux induced by the write coil 22 across the bridge produces no net flux through the read coil 24.

The reluctance of the gap 21 may be varied by means of a magnetic shunt. As shown in Fig. 1, the magnetic shunt may be provided, for example, by means of a screw 26 of magnetic material which threadedly engages a bracket 28 supported from a frame (not shown) to which the transducer head itself is secured. Thus, the screw 26 and the core 10 are held in fixed relation to each other, except for the movement of the screw, by threading it into and out of the bracket 28. The screw is arranged so that it may be advanced into the region of the gap 21 so as to vary the reluctance of the gap. A nut 30 may be used to lock the screw in any desired position once adjustment is effected for balancing the magnetic circuit of the core 10. It may be that the magnetic shunt alone is not sufficient to achieve balance of the magnetic bridge circuit. It has been found that notching the core, as indicated at 31, modifies the reluctance of the one arm of the bridge. The notching may be used as a rough balancing means, with the screw 26 serving as a final fine adjustment for balancing after the head is mounted.

Not only is there no coupling directly between the coils 22 and 24 through the magnetic circuit provided by the core 10, but the coils 22 and 24 are oriented at right angles with respect to each other to minimize coupling between the two coils by fields which are external to the magnetic circuit of the head. Thus, the only coupling between the coil 22 and coil 24 is that indirectly produced by the presence of the magnetic tape across the gaps, such as indicated at 32, the tape being driven past the gaps by tape transport means including a supply reel 33 and take-up reel 35.

A signal applied to the write coil 22 produces variations in the flux density across the gap 18, which variations are reproduced on the magnetic tape 32. As the tape continues on and passes over the gap 20, the magnetic variations produced on the tape 32 cause variations in the magneto-motive force appearing across the gap 20, inducing a signal in the read coil 24. The two gaps 18 and 20 can be placed quite close together without any significant cross-coupling.

Figure 3:
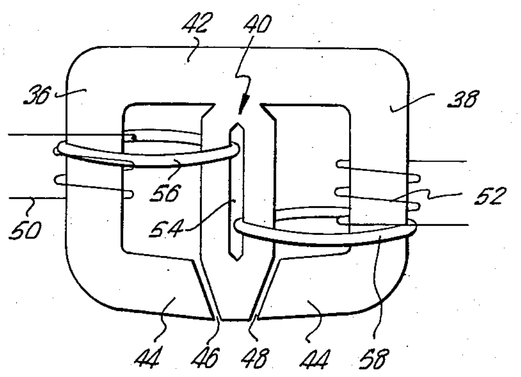
Fig. 3 is an alternative embodiment.

In the alternative embodiment in Fig. 3, the magnetic core is constructed with three substantially parallel branch portions, the outer branch portions being indicated at 36 and 38, and the central branch portion being indicated at 40. The core structure is completed by end portions 42 and 44 which extend between the respective ends of the outer portions 36 and 38.

Closely spaced reading and writing gaps 46 and 48 are formed in the end portion 44 between the junction of the central portion 40 and the end portion 44 of the core. The end portion 44 angles off on either side of the gaps toward the outer portions 36 and 38 in order that the tape, such as indicated at 32, may be drawn over and past the gaps. A writing coil 50 is wound on the outer portion 36, while a similar coil 52 is wound on the outer portion 38 of the core. These coils induce or respond to flux changes across the respective gaps 46 and 48.

In order to prevent flux induced by the writing coil 50 from directly linking and inducing a current in the reading coil 52, the central branch portion 40 of the core is provided with an elongated slot 54 which divides the central portion into two parallel low-reluctance flux paths. A first shorting coil 56 extends through the opening 54 in the central branch portion 40 and loops around the outer branch portion 36. A second shorting coil 58 extends through opening 54 and loops the outer branch portion 38. It will be recognized that two closed loop flux paths respectively incorporating the gaps 46 and 48 are provided which do not link either of the shorting coils 56 and 58, but do link the coils 50 and 52. Thus, one flux path is provided by the outer branch portion 36, the end portion 42, the left-hand side of the central branch portion 40, the gap 46 and part of the end portion 44. The other closed loop flux path includes the outer branch portion 38, the end portion 42 and part of the central branch portion 40, the gap 48 and the right-hand part of the end portion 44. Since neither of these flux paths loop one of the shorting coils 56 or 58, there is no interaction between changes in the flux of these two flux paths and the shorting coils.

However, it will be seen by inspection that many other flux paths within the core linking one or the other or both of the coils 50 and 52 also link one or the other or both of the shorting coils 56 and 58. For example, the closed loop flux path involving the outer branch portions 36 and 38 and the end portions 42 and 44 of the core, while directly coupling the coils 50 and 52, also link the shorting coils 56 and 58. The counter-field produced by currents induced in the shorting coils inhibit the build-up of flux in the unwanted flux paths which link the shorting coils. Thus, the shorting coils act to prevent or eliminate the build-up of flux in the unwanted flux paths which otherwise would directly couple the reading coil 50 and the writing coil 52. As a result, even though the coils 50 and 52 are wound on the same core, there is no substantial direct coupling between the two coils in the configuration of Fig. 3. However, there is coupling between the coils and the respective reading and writing gaps 46 and 48.

In the configuration of Fig. 1 it was seen that no net flux linked the reading and writing coils because the coils were arranged on opposite diagonals of a magnetic bridge circuit. Thus, the arrangement of Fig. 1 involved the balancing of the reluctance of several flux paths in order to produce a net flux of zero through one coil as a result of signal currents in the other coil. In the arrangement of Fig. 3 the reading and writing coils again are isolated but by the suppression of flux in any paths which would directly couple the reading and writing coils. This is accomplished by the shorting turns which link flux in any of the unwanted flux paths.

Figure 4:
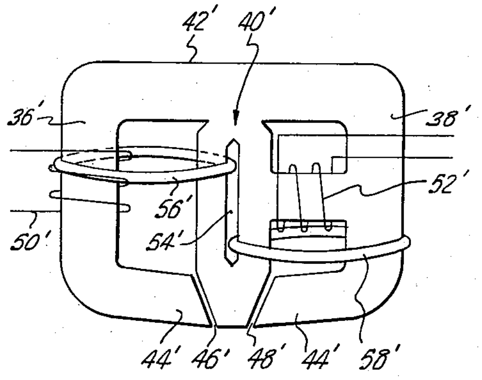
Fig. 4 is yet another embodiment of a transducer incorporating the principles of the present invention.

It is possible to combine the arrangements of Fig. 1 and Fig. 3 into one dual head, as shown in Fig. 4. It will be seen that the core arrangement of Fig. 4 is identical to that of Fig. 3 except that the read-out coil 52′ is wound on a shunting arm extending perpendicularly between the right-hand flux path of the central branch portion 40′ and the outer branch portion 38′ of the core. As in the configuration of Fig. 1, the reading and writing coils 50′ and 52′ are at right angles to each other so as to minimize coupling by external fields. Also, two flux paths are provided which directly link the reading and writing coils, which flux paths if made equal in reluctance result in a net zero flux passing through one coil as a result of signal currents in the other coil. The shorting turns have the added effect of greatly reducing the flux produced across the reading gap as a result of signal currents passing through the writing coil. Any flux generated by signal currents in the writing coil 50′ which remain in the outside flux path loop formed by the core, so as to pass through both the reading and writing gaps 46′ and 48′, necessarily links the shorting coils 56′ and 58′. Therefore, any flux in such a path is necessarily suppressed by the action of the shorting coils.

From the above description it will be appreciated that a double transducer head is provided by means of which recording and play-back from magnetic tape can be carried out simultaneously. Due to the closeness of the spacing possible between the two gaps, which is the result of the unique core design, the delay between recording and playing back can be reduced to the point where a direct comparison between the input signal and the recorded signal can be made. The head is therefore particularly useful in computer and other data processing devices which require a check operation of all recorded data. By use of the present head, a check can be made simultaneously with the recording of the data, thereby reducing considerably the time involved in the data recording operation..

While the invention has been described as applicable to recording on magnetic tape, it will be apparent that it is equally applicable to recording on wire, recording on a magnetic drum, or recording on any magnetic medium where it is desired to get substantially simultaneous play-back. Moreover, the invention in its broader aspect may be applied to magnetic devices in general where it is necessary to isolate magnetically two coils that are in close proximity.

What is claimed is:

1. A magnetic read-write head for recording on and reading off magnetic tape comprising a magnetic core structure defining a first closed loop magnetic flux path, the core structure having a first high reluctance gap completely separating the core structure in the region of the first flux path, and further defining a second closed loop magnetic flux path, the core structure having a second high reluctance gap completely separating the core structure in the region of the second flux path, the core structure having a portion thereof common to both flux paths, a portion common to the first flux path only, and a portion common to the second flux path only, the respective high reluctance gaps being positioned between the portion of the core structure in common with both paths and the respective ones of the remaining portions of the core structure common only to the first and second paths, a first coil wound on the portion of the core common to the first flux path, a second coil wound on the portion of the core common to the second flux path, means for transporting magnetic tape successively past the two gaps in the first and second paths, the first coil producing variations in the magnetic flux across the first gap in response to a signal applied to the first coil for recording magnetic variations on the magnetic tape, the second coil generating a signal in the second coil in response to the changes in flux produced by the magnetized tape as it passes the second gap, and means for preventing any variable flux generated across the gap in the first path from generating corresponding flux changes in the gap in the second path.

2. A magnetic read-write head comprising a magnetic core structure defining a first closed loop magnetic flux path, the core structure having a first high reluctance gap completely separating the core structure in the region of the first flux path, and further defining a second closed loop magnetic flux path, the core structure having a high second reluctance gap completely separating the core structure in the region of the second flux path, the core structure having a portion thereof common to both flux paths, a portion common to the first flux path only, and a portion common to the second flux path only, the respective high reluctance gaps being positioned between the portion of the core structure in common with both paths and the respetcive ones of the remaining portions of the core structure common only to the first and second flux paths, a first coil wound on the portion of the core common to the first flux path, a second coil wound on the portion of the core common to the second flux path, and means for substantially eliminating any net flux generated across the gap in the first path from generating corresponding flux changes in the gap in the second path.

3. Apparatus as defined in claim 2 wherein the means for eliminating any linking flux between the coils includes a third portion of the core, the third portion shunting the portion of the core on which the second coil is wound, whereby two flux paths are provided linking the two coils in which the direction of the flux in the two paths are opposite in the portion of the core in which one coil is wound and the same in the portion of the core in which the other coil is wound.

4. Apparatus as defined in claim 2 wherein the means for eliminating any linking flux includes a pair of shorting coils, one of said shorting coils being arranged to link portions of the core defining the first flux path at two positions whereby no net flux in the first path links the said one shorting coil, the other shorting coil being arranged to link portions of the core defining the second flux path at two positions whereby no net flux in the second path links said other shorting coil, the shorting coils further being arranged to link all unwanted flux paths linking the first and second coils.

5. A combined record-playback magnetic head comprising a magnetic core including an outer rim portion defining a closed loop magnetic path, a first branch portion bridging the rim portion and defining a shunt magnetic path, and a second branch portion extending between the center of the first branch portion and the rim portion at substantially right angles to the first branch portion, the core having a pair of closely spaced transverse gaps in the rim portion of the core positioned respectively on either side of one of the junctions between the first branch portion and the rim portion, a first coil positioned on the rim portion of the core at a point diametrically opposite to the junction point between the rim portion and the second branch portion of the core, and a second coil positioned on the second branch portion of the core.

6. Apparatus as defined in claim 5 in which the core has an additional gap in the rim portion thereof between the point of junction with the first branch portion opposite the junction where said pair of gaps are positioned and the point of junction with the second branch portion.

7. Apparatus as defined in claim 6 further including means for adjusting the reluctance of said additional gap to balance the reluctances of the magnetic bridge circuit provided by the core.

8. A double transducer head for simultaneously writing and reading signals on a magnetic tape, said head comprising a magnetic core including a substantially E-shaped portion, a substantially U-shaped portion, and a substantially I-shaped portion, the open part of the E-shaped portion and of the U-shaped portion being bridged by the I-shaped portion, whereby the U-shaped portion and the I-shaped portion form a first low reluctance closed loop magnetic path, and the E-shaped portion and the I-shaped portion form second and third closed loop low reluctance magnetic paths, the core having a pair of closely spaced magnetic gaps formed at one junction between the three portions constituting a reading gap and writing gap, the core further having at least one magnetic gap formed at the other junction between the three portions, a first conductive coil wound on the central arm of the E-shaped portion of the core, a second conductive coil wound on the central part of the U-shaped portion, the first and second coils being perpendicular to each other, whereby the coils separately respond to or induce changes in flux across the respective reading and writing gaps only without direct magnetic coupling between the coils, and adjustable means including a slug of magnetic material positioned adjacent the gap at the opposite junction of the three portions of the core from the read and write gaps for balancing the reluctance of the respective magnetic flux paths in the core.

9. A double transducer head for simultaneously writing and reading signals on a magnetic tape, said head comprising a magnetic core including a substantially E-shaped portion, a substantially U-shaped portion, and a substantially I-shaped portion, the open part of the E-shaped portion and of the U-shaped portion being bridged by the I-shaped portion, whereby the U-shaped portion and the I-shaped portion form a first low reluctance closed loop magnetic path, and the E-shaped portion and the I-shaped portion form second and third closed loop low reluctance magnetic paths, the core having a pair of closely spaced magnetic gaps formed at one junction between the three portions constituting a reading gap and writing gap, a first conductive coil wound on the central arm of the E-shaped portion of the core, a second conductive coil wound on the central part of the U-shaped portion, the first and second coils being perpendicular to each other, whereby the coils separately respond to or induce changes in flux across the respective reading and writing gaps only without direct magnetic coupling between the coils, and means for balancing the reluctance of the respective magnetic flux paths in the core.

10. A double transducer head for simultaneously writing and reading signals magnetically, said head comprising a magnetic core including a substantially E-shaped portion, a substantially U-shaped portion, and a substantially I-shaped portion, the open part of the E-shaped portion and of the U-shaped portion being bridged by the I-shaped portion, whereby the U-shaped portion and the I-shaped portion form a first low reluctance closed loop magnetic path, and the E-shaped portion and the I-shaped portion form second and third closed loop low reluctance magnetic paths, the core having a pair of closely spaced magnetic gaps found at one junction between the three portions constituting a reading gap and writing gap, a first conductive coil wound on the central arm of the E-shaped portion of the core, and a second conductive coil wound on the central part of the U-shaped portion, the first and second coils being perpendicular to each other, whereby the coils separately respond to or induce changes in flux across the respective reading and writing gaps only without direct magnetic coupling between the coils.

11. Apparatus for simultaneously recording and playing back information magnetically on magnetic tape, said apparatus comprising a magnetic core defining a bridge type magnetic circuit including four branch reluctance arms, the core including a first low permeability gap located in the portion defining one reluctance arm of the bridge, a first low magnetic reluctance path across one diagonal of the bridge, and a second low magnetic reluctance path across the other diagonal, the core including a second low permeability gap located in the portion defining the second diagonal flux path, a coil encircling the portion of the core defining the first diagonal magnetic path, a coil encircling the portion of the core defining the second diagonal magnetic path, the coils being positioned with their principal axes at right angles to each other, means for adjusting the reluctance of one arm of the bridge to balance the bridge, and means for transporting magnetic tape successively past the two low permeability gaps in the core.

12. Apparatus for simultaneously recording and playing back information magnetically on magnetic tape, comprising a magnetic core defining a bridge type magnetic circuit including four branch reluctance arms, the core including a first low permeability gap located in the portion defining one reluctance arm of the bridge, a first low magnetic reluctance path across one diagonal of the bridge, and a second low magnetic reluctance path across the other diagonal, the core including a second low permeability gap located in the portion defining the second diagonal flux path, a coil encircling the portion of the core defining the first diagonal magnetic path, a coil encircling the portion of the core defining the second diagonal magnetic path, the coils being positioned with their principal axes at right angles to each other, and means for passing magnetic tape past the two gaps.

References Cited in the file of this patent

UNITED STATES PATENTS

| | | |
|---|---|---|
| 1,779,269 | Clough | Oct. 21, 1930 |
| 2,373,096 | Bonell | Apr. 10, 1945 |
| 2,411,849 | Camras | Dec. 3, 1946 |
| 2,418,553 | Irwin | Apr. 8, 1947 |
| 2,475,421 | Camras | July 5, 1949 |
| 2,483,123 | Clapp | Sept. 27, 1949 |
| 2,540,711 | Camras | Feb. 6, 1951 |
| 2,626,297 | Leippe | Jan. 20, 1953 |
| 2,633,504 | Palle-Finn Beer | Mar. 31, 1953 |
| 2,658,114 | Buhrendorf | Nov. 3, 1953 |
| 2,765,119 | Marvin | Oct. 2, 1956 |
| 2,803,708 | Camras | Aug. 20, 1957 |